United States Patent
Misura et al.

(10) Patent No.: US 7,503,090 B2
(45) Date of Patent: Mar. 17, 2009

(54) GLASS WASHING MACHINE WITH CONVEYOR AND BRUSH SPEED CONTROL

(75) Inventors: Michael S. Misura, Norton, OH (US); Robert R. Shepherd, Mogadore, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 0 days.

(21) Appl. No.: 11/789,402

(22) Filed: Apr. 24, 2007

(65) Prior Publication Data

US 2007/0192974 A1 Aug. 23, 2007

Related U.S. Application Data

(62) Division of application No. 10/661,880, filed on Sep. 11, 2003, now Pat. No. 7,232,493.

(51) Int. Cl.
- A46B 13/02 (2006.01)
- B08B 7/00 (2006.01)
- B08B 7/04 (2006.01)
- A46B 13/04 (2006.01)

(52) U.S. Cl. ............ 15/77; 15/88.2; 15/88.3; 134/6; 134/9; 134/15; 134/18; 134/42

(58) Field of Classification Search .......... 15/77, 15/88.2, 88.3, 3.12, 3.16, 3.19, 3.2, 102; 65/61; 134/6, 9, 15, 18, 32, 42; 451/182, 451/184, 188, 190

See application file for complete search history.

(56) References Cited

U.S. PATENT DOCUMENTS

| | | | |
|---|---|---|---|
| 2,133,679 A | * | 4/1938 | Cleff ................... 144/4.2 |
| 2,293,858 A | | 8/1942 | Schafer |
| 3,093,852 A | | 6/1963 | Madge |
| 3,497,897 A | | 3/1970 | Wehr |
| 3,566,429 A | | 3/1971 | Hamilton |
| 3,749,949 A | * | 7/1973 | Muller ................... 310/59 |
| 3,944,461 A | | 3/1976 | Ogron |
| 4,702,017 A | | 10/1987 | Lenhardt |
| 4,774,738 A | | 10/1988 | Lenhardt |
| 4,782,545 A | | 11/1988 | Aiassa |
| 5,005,250 A | | 4/1991 | Trautmann et al. |
| 5,010,619 A | | 4/1991 | Lisec |
| 5,365,629 A | | 11/1994 | Weihe et al. |
| 5,878,866 A | | 3/1999 | Lisec |
| 5,964,337 A | | 10/1999 | Hallahan |
| 6,018,842 A | | 2/2000 | Ayres |
| 6,295,684 B1 | | 10/2001 | Skinner |
| 6,301,930 B1 | | 10/2001 | Warner et al. |
| 7,232,493 B2 | * | 6/2007 | Misura et al. ............. 134/6 |
| 2003/0172927 A1 | | 9/2003 | Young et al. |

* cited by examiner

*Primary Examiner*—Gary K Graham
(74) *Attorney, Agent, or Firm*—Tarolli, Sundheim, Covell & Tummino LLP (57) ABSTRACT

A glass sheet washing machine comprising a conveyor for moving a glass sheet along a path of travel at a controlled linear speed and a brush rotatable at a controlled rotational speed positioned along said path of travel such that said brush contacts the glass sheet moves along said path of travel wherein the linear speed of the conveyor and the rotational speed of the brush are variable and one of the linear speed and the rotational speed is dependent on any other of the linear speed and the rotational speed.

19 Claims, 6 Drawing Sheets

GLASS WASHING MACHINE WITH CONVEYOR AND BRUSH SPEED CONTROL

CROSS REFERENCE TO RELATED APPLICATIONS

The present application is a divisional application of currently pending U.S. application Ser. No. 10/661,880 having a filing date of Sep. 11, 2003 entitled "GLASS WASHING MACHINE WITH CONVEYOR AND BRUSH SPEED CONTROL". The present application claims priority to, and incorporates the above-identified application in its entirety for all purposes.

TECHNICAL FIELD

The present invention relates generally to glass processing equipment and, in particular, to a glass sheet washing machine with coordinated conveyor and brush speeds.

BACKGROUND ART

Glass sheets or plates are used in the construction of a wide variety of items including doors, windows, furniture, mirrors, and insulating glass units. Typically, a glass sheet or plate is mounted using an adhesive and/or a sealant. For an adhesive and/or a sealant to properly adhere to a glass sheet or plate, the glass sheet or plate must be clean. As a result, glass sheet washing machines have been developed.

Known glass sheet washing machines include a top row of rotating brush rollers spaced apart from a bottom row of rotating brush rollers. Sprayers spray a washing or rinsing liquid on each rotating brush roller. A conveyor includes drive rollers positioned adjacent to the rotating brush rollers of each row, which move the glass sheets through the washing machine at a controlled speed. The glass sheets are passed through the conveyor with one large face up and one large face down. The top row of rotating brush rollers acts on one large face of the glass and the bottom row acts on the other large face.

Recently, the market for glass windows and doors has been driven by the use of low emissivity ("low-e") and other energy efficient coated glass. Many of these coatings can be scratched or otherwise damaged by the glass washing machines of the prior art that use a single brush speed. Some prior art washing machines attempted to address this problem by the use of a two-speed brush having a low and a high-speed setting. Other prior art glass washing machines raise the brushes to reduce contact with the glass or use special brushes in an effort to eliminate the scratching problem. However, these methods may either reduce the effectiveness of the washing machine or require repositioning or changes of the brushes.

There is a need for a glass washing machine wherein the linear speed of the glass sheet along a path of travel through the glass washing machine and the rotational speed of the brushes are dependant upon one another such that a change in one automatically results in a corresponding change in the other.

DISCLOSURE OF INVENTION

The present disclosure concerns a glass sheet or plate washing machine. The disclosed washing machine includes a conveyor for moving glass sheets along a path of travel at a controlled linear speed. One or more rotating brushes positioned along the path of travel contact the glass sheet as it moves through the machine. The linear conveyor speed and the rotational brush speed are both variable. The linear conveyor speed or the rotational brush speed is dependent on the other of the linear conveyor speed or rotational brush speed.

In one embodiment, the conveyor drive motor and one or more brush motors are electronically coupled. In this embodiment, the linear conveyor speed may be controlled by controlling the voltage applied to a conveyor drive motor and the rotational brush speed is controlled by controlling the voltage applied to a brush drive motor. A user input device may be used to adjust the linear conveyor speed and the rotational brush speed is dependant on the linear speed. The linear speed and the rotational speed may be continuously variable and are controlled to maintain a constant ratio of linear conveyor speed to rotational brush speed in one embodiment.

In one embodiment, the ratio of voltage applied to the conveyor drive motor to the voltage applied to the brush drive motor is about 2 to 1. In one embodiment, the linear conveyor speed is from about 1 to 30 feet per minute and the rotational brush speed is from about 90 to 644 revolutions per minute. In an alternate embodiment the conveyor drive motor and the brush motor are mechanically coupled.

In an alternate embodiment of the invention, if the speed of the conveyor falls below a threshold value, the brush roll speed is maintained at a minimum speed regardless of conveyor speed. As an illustration, it has been found that for certain brushes if brush speed drops below a threshold, cleaning efficiency suffers. In this embodiment, if the conveyor speed falls below 10 feet per minute, the brush speed is maintained at 300 rpm. Above that conveyor speed, a linear relation between brush and conveyor speed is maintained until a maximum of 30 feet per minute and 644 rpm is achieved.

The disclosed washing machine may be used to practice a method of washing glass sheets. In the method, a glass sheet is moved along a path of travel at a controlled linear speed and the glass sheet is contacted by one or more rotating brushes as it moves along the path of travel. The linear speed of the sheet and the rotational speed of the brushes are both variable and the linear speed or rotational speed is dependent on the other of the linear speed or rotational speed.

BEST MODE FOR CARRYING OUT THE INVENTION

The present disclosure is directed to a glass sheet washing machine 10 having a conveyor and brush speed control 100 for cleaning glass sheets 12 or plates. The glass washing machine 10 has a conveyor 38 (FIGS. 2 and 3) which moves the glass sheets along a path of travel at a variable linear speed, one or more rotating brushes 74a, 74b which rotate at a variable rotational speed and a controller 101. In the illustrated embodiment, the conveyor 38 and rotating brushes 74a and 74b are electronically coupled to the controller 101. The speed of the conveyor and/or the speed of the brushes can be input to the controller by a user. The linear speed of the conveyor 38 and the rotational speed of the brushes 74a 74b are inter-dependent such that a change in the speed of one will automatically result in a corresponding change in the speed of the other.

Figure 2:
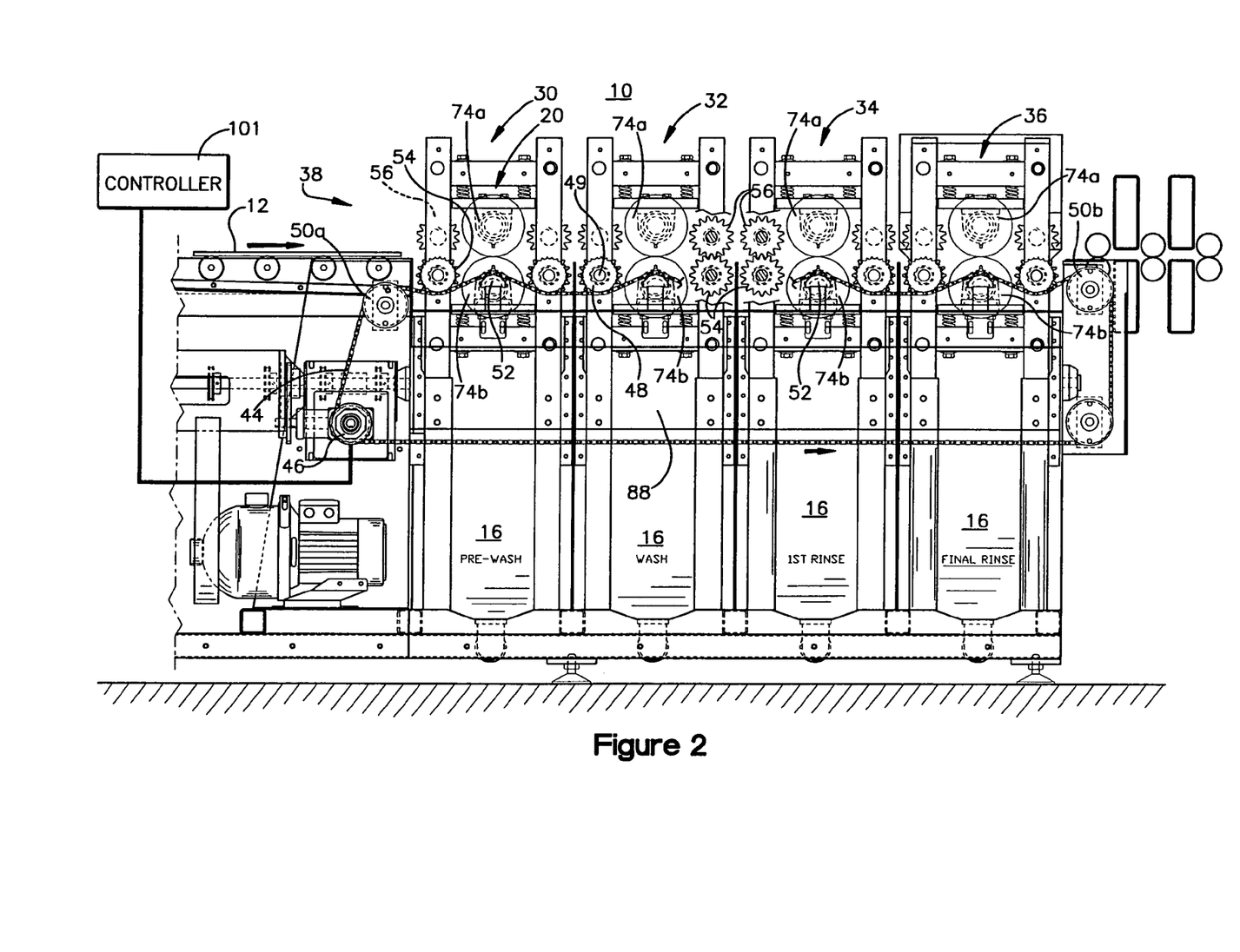
FIG. 2 is a side elevational view of a glass washing machine with conveyor and brush speed control.

Referring to FIG. 2, the illustrated glass washing machine 10 includes a prewash station 30, a wash station 32, a first rinse station 34 and a final rinse station 36. Referring to FIGS. 2-5, in the illustrated embodiment, each station 30, 32, 34, 36 includes a conveyor 38, an upper rotating brush 74a, a lower rotating brush 74b, a reservoir 16, a pump 18, a liquid applicator 20 and a brush motor 78. Additional information regarding washing stations 30, 32, 34, 36 can be found in application Ser. No. 10/375,557, entitled "Glass Washing Machine with Broken Glass Removal," filed on Feb. 26, 2003 which is assigned to the assignee of the present invention and is incorporated herein in its entirety by reference.

Referring to FIGS. 2-5, the illustrated conveyor 38 includes an upper set of rollers 40 and a lower set of rollers 42. The rollers 40, 42 move the glass sheet 12 through the washing machine 10 at a linear speed that is variable over a range of linear speeds and controlled by the controller.

Figure 4:
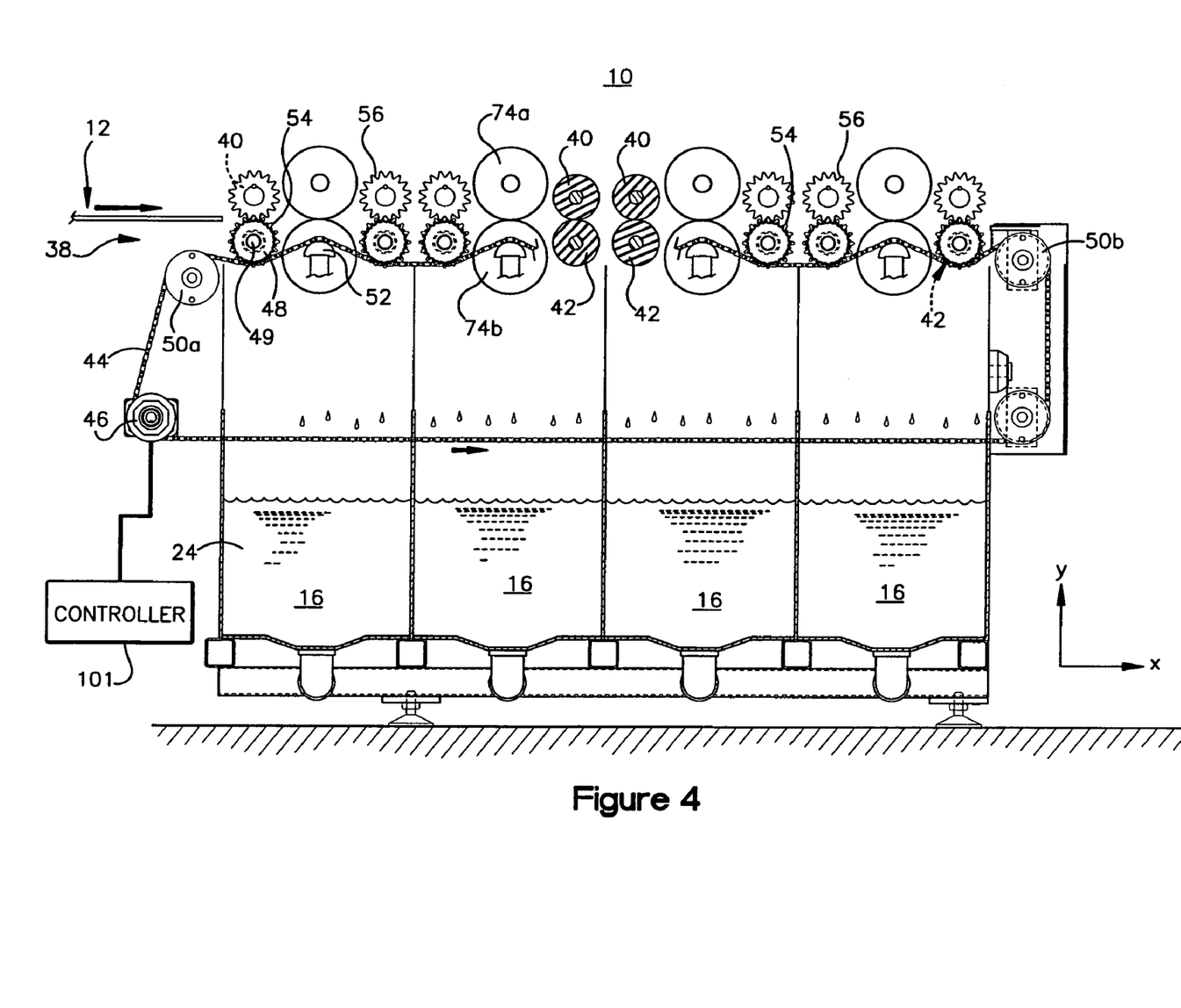
FIG. 4 is a schematic illustration of a conveyor in a glass washing machine with conveyor and brush speed control.

Referring to FIG. 4, the rollers 40, 42 for all four stations 30, 32, 34, 36 are driven by a single chain 44 and a single conveyor motor 46 in the illustrated embodiment. The chain 44 engages a sprocket 48 which is mounted to a shaft 49 which supports the lower rollers 42 (see FIGS. 2 and 4). The chain 44 is maintained in engagement with the sprockets 48 for rotating the lower rollers 42 by idler gears 50a, 50b and tensioning guides 52. Each of the shafts 49 also supports a gear 54 positioned inward (in the z direction) of the sprocket 48. Each of the upper rollers 40 is rotated by a gear 56 that meshes an associated gear 54 coupled to the shaft 49. The conveyor motor 46 moves the chain 44 along the path illustrated in FIG. 4 to rotate each of the lower rollers 42. The gear 54 engages the gear 56 thereby causing rotation of the upper roller 40. Glass placed in the conveyor 38 is moved through the washing machine 10 by the rollers 40, 42. To accommodate different thickness glass the upper roller 40 is mounted for up and down movement in the y direction as seen in the reference axis of FIGS. 2 and 4.

Figure 3:
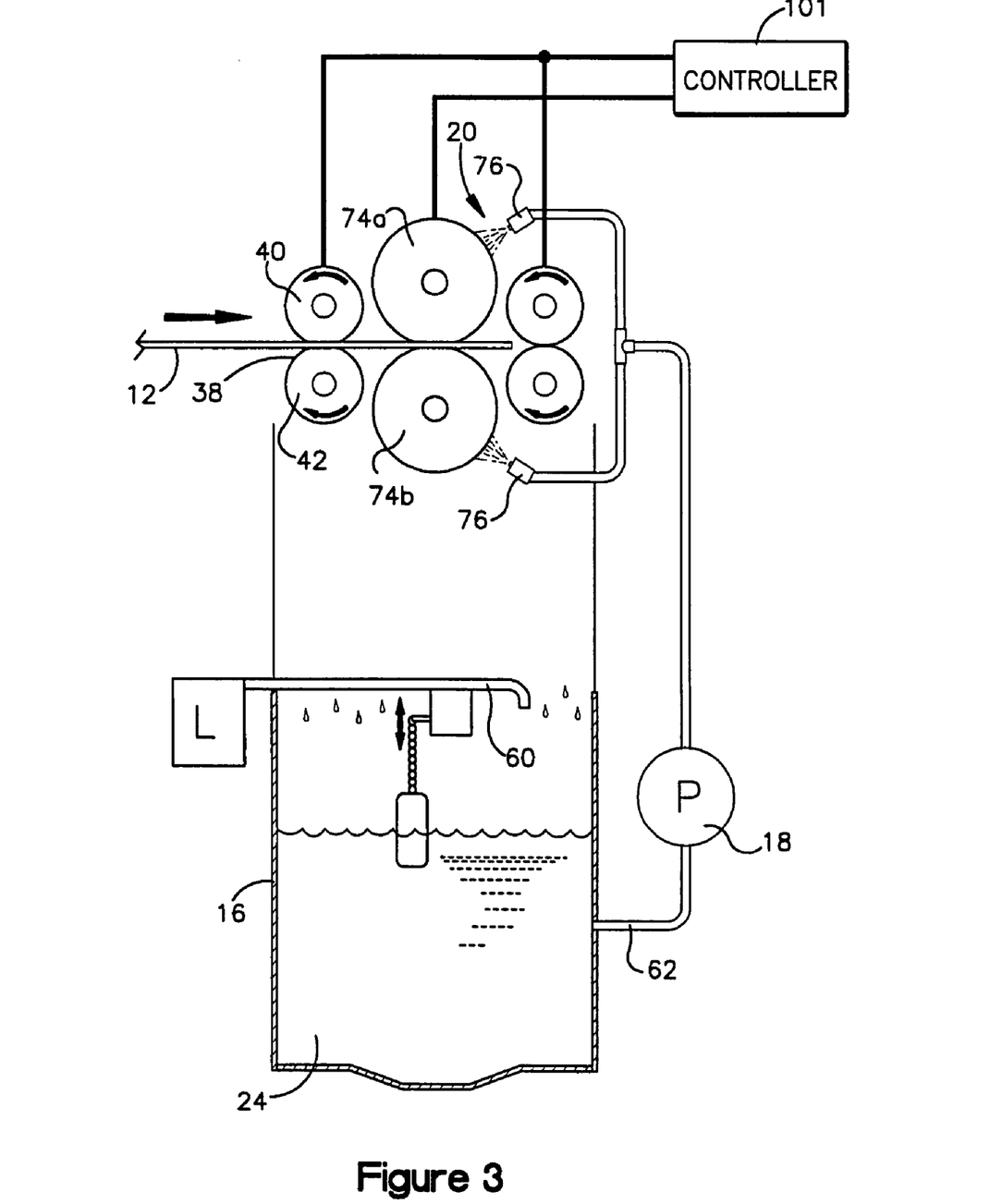
FIG. 3 is a schematic representation of one station of a glass washing machine with conveyor and brush-speed control.

Referring to FIGS. 2-4, each station 30, 32, 34, 36 include its own reservoir 16. Each reservoir 16 includes a cleaning liquid 24. In the illustrated embodiment, the reservoirs 16 of the prewash station 30, the first rinse station 34 and the final rinse station 36 contain water. The reservoir 16 in the wash station 32 contains a solution of water and a detergent. Each reservoir 16 includes an inlet 60 and an outlet 62 (FIG. 3). The inlet 60 provides cleaning fluid 24 to the reservoir 16. The outlet 62 from the reservoir 16 is coupled to the pump 18 that withdraws the cleaning liquid 24 from the reservoir and directs it to a liquid applicator 20.

Referring to FIG. 3, the pump 18 is coupled to the reservoir 16 in each station 32, 34, 36. In the illustrated embodiment, the liquid applicator 20 comprises an upper rotating brush 74a, a lower rotating brush 74b and spray nozzles 76. The rotating brushes 74a, 74b are positioned along a path of travel defined by the conveyor 38. The rotating brushes 74a, 74b contact the glass sheets as they are moved through the washing machine 10 by the conveyor 38. The pump 18 provides cleaning liquid 24 to the spray nozzles 76 in each station. The spray nozzles 76 spray the cleaning liquid 24 onto the rotating brushes 74a, 74b.

Figure 5:
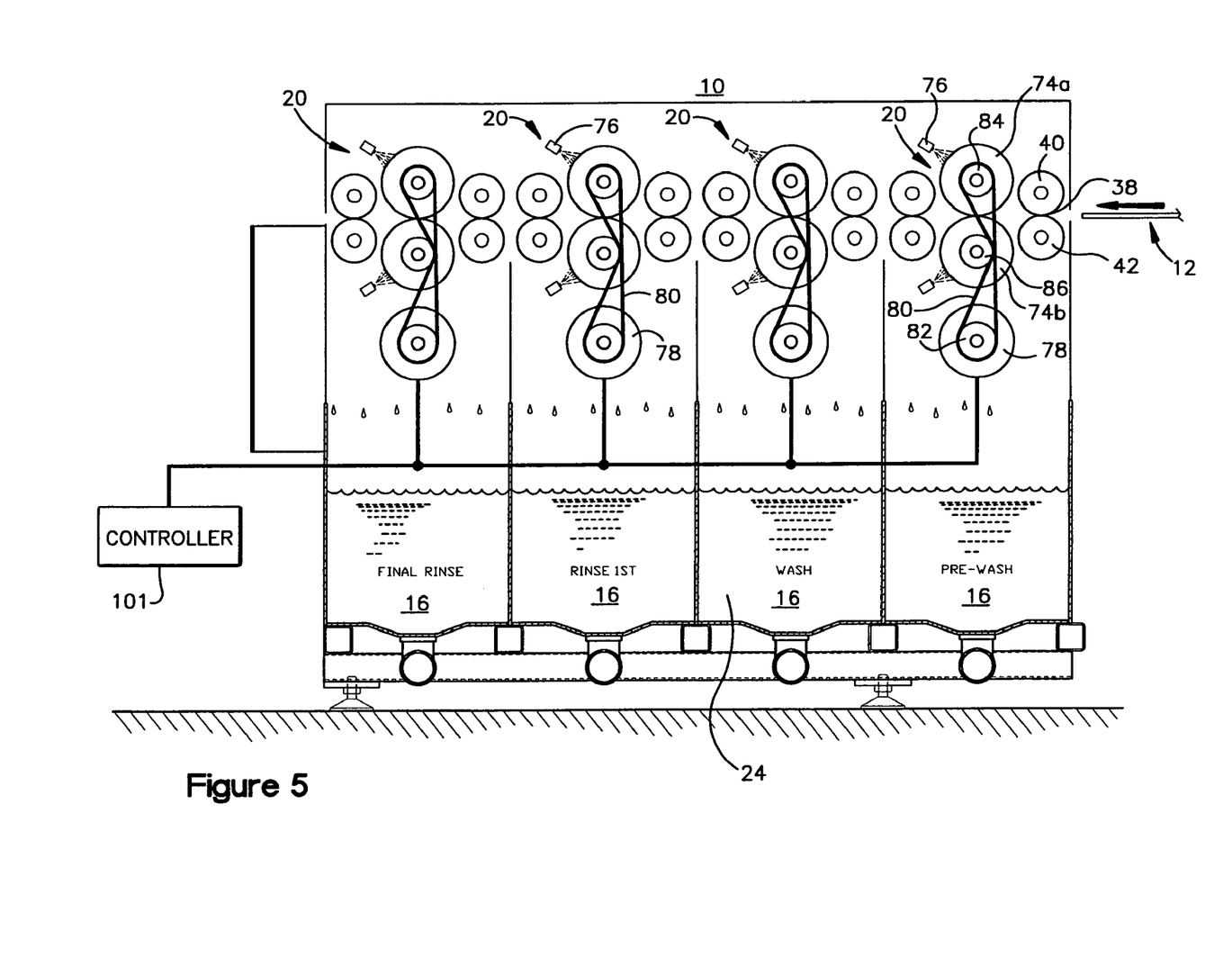
FIG. 5 is a schematic illustration of driven brushes in a glass washing machine having a brush speed control.

Referring to FIGS. 3 and 5, a first plurality of spray nozzles 76 are positioned to spray cleaning liquid 24 along substantially the entire length of an upper rotating brush 74a. Likewise, an array of spray nozzles 76 is positioned to spray cleaning liquid 24 onto a lower brush 74b along substantially the entire length of the lower rotating brush 74b.

Figure 6:
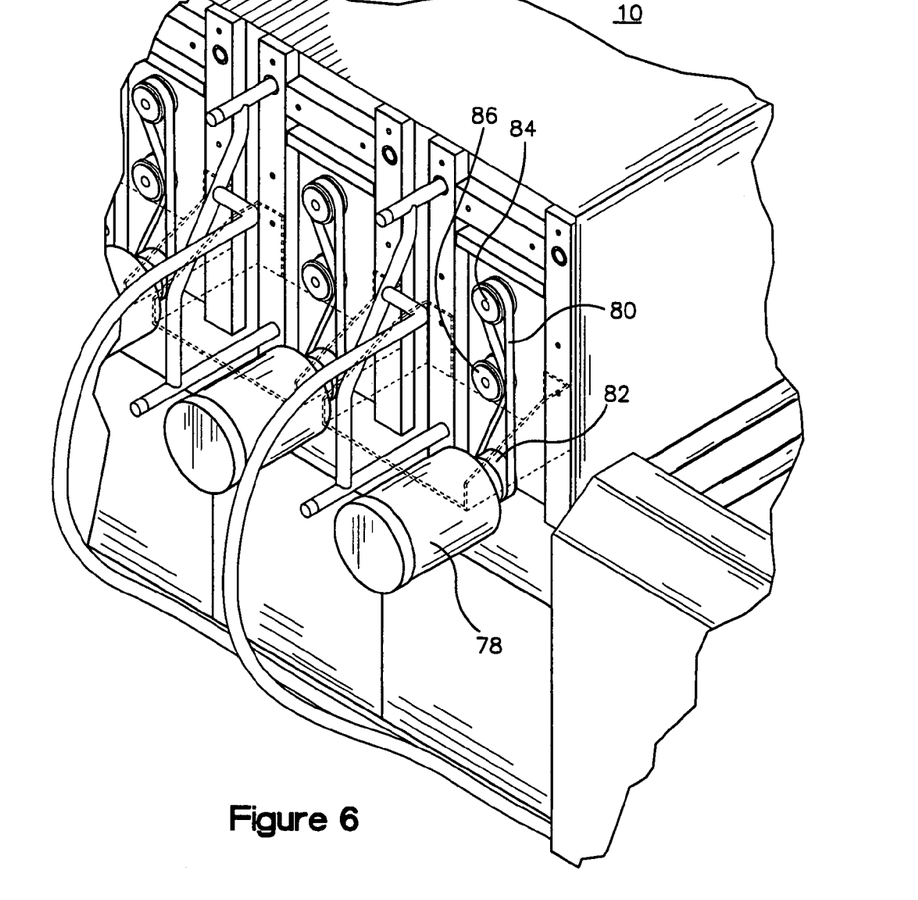
FIG. 6 illustrates motors driving brushes and conduits to sprayers of a glass washing machine.

FIG. 6 illustrates one way of driving the rotating brushes 74a, 74b. In the embodiment of FIG. 6, a brush motor 78 positioned outside the washing machine 10 drives each pair of brushes 74a, 74b at a controlled rotational speed variable over a range of rotational speeds. In each station, a belt 80 is positioned around a pulley 82 on the brush motor 78 and around a pulley 84 on an upper brush 74a. The belt engages a side of a pulley 86 on a lower brush 74b. In this configuration, rotation of the pulley 82 by the brush motor 78 in a clockwise direction will rotate the upper brush 74a in a clockwise direction and rotate the lower brush 74b in a counterclockwise direction. Similarly, if the pulley 82 is driven in a counterclockwise direction by the motor 78, the upper brush 74a is driven in a counterclockwise direction and the lower brush 74b is driven in a clockwise direction.

In the exemplary embodiment, the conveyor motor 46 and brush motors 78 are electrically coupled to a controller 101. In the embodiment illustrated by FIG. 1, the controller 101 is electrically coupled to a variable speed conveyor motor drive 102, which is electrically coupled to a conveyor motor 46, and a variable speed brush motor drive 103. The variable speed brush motor drive is electrically coupled to four brush motors 78. The controller 101 can be any device capable of controlling the speed of either the conveyor motor 46 and/or brush motor 78. In the exemplary embodiment, the controller 101 is coupled to a user input device 150, which permits a user to select the speed of the conveyor motor 46 and/or brush motor 78.

Figure 1:
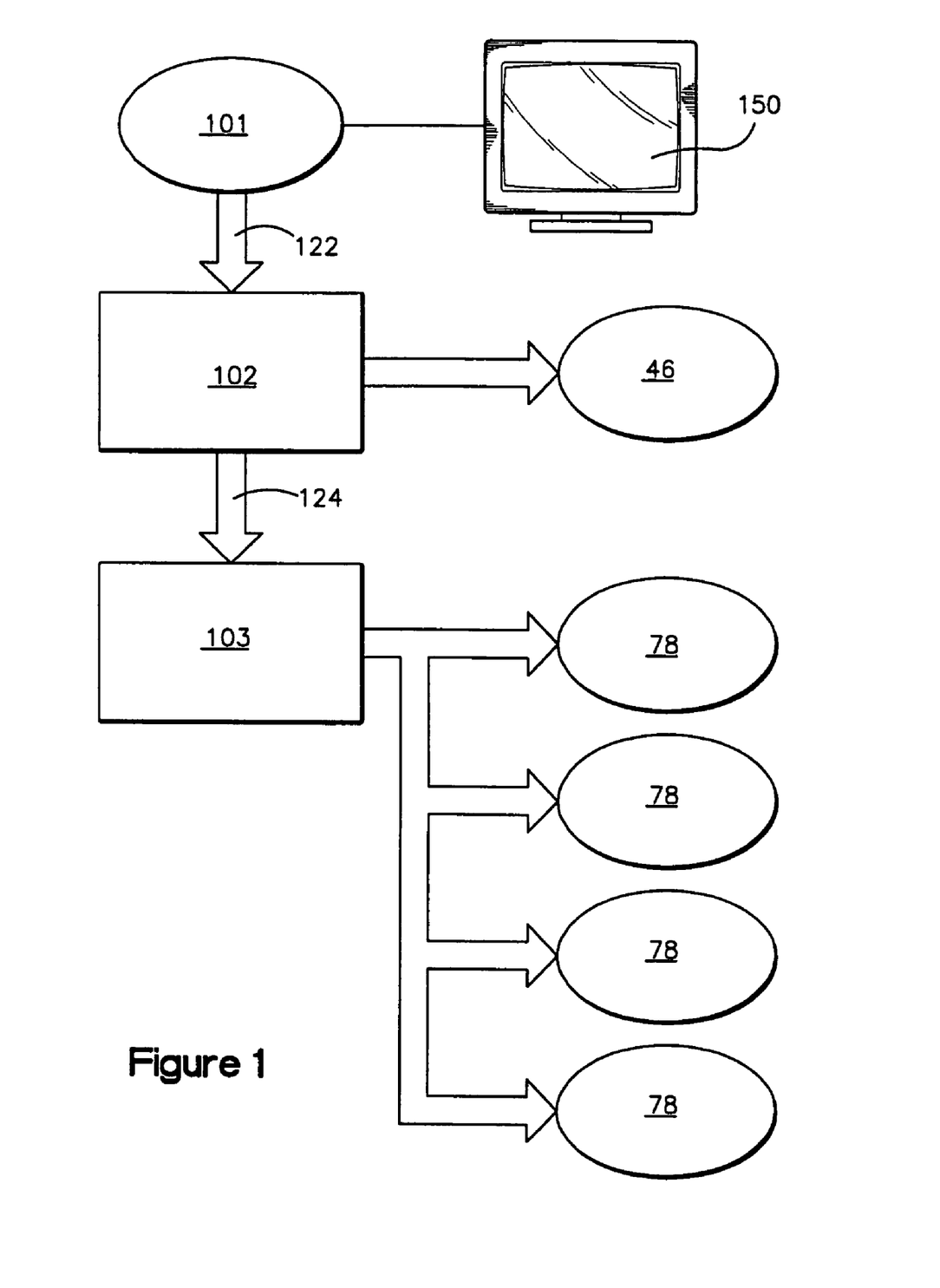
FIG. 1 is a flow chart depicting coordinating a conveyor speed and a brush speed with a controller input.

In the embodiment illustrated by FIG. 1, the controller 101 provides a signal 122 to the conveyor drive 102. The conveyor drive 102 sets the speed of the conveyor motor 46 based on the value of the signal 122. The conveyor drive 102 also provides a signal 124 to the brush motor drive 103. The value of the signal 124 is dependent on the value of the signal 122. The motor drive 103 sets the speed of the brush motors 78 based on the value of the signal 124.

The reference signal 122 sent by the controller may be in the form of DC voltage 0-10 volts DC) signal. The (0-10 v) voltage signal 122 provided to the variable speed conveyor motor drive 102 controls how fast the conveyor motor 46 turns. For example, the speed of the conveyor motor 46 may range from 0 rpm (0 hz) when the signal is 0 volts DC to 1920 rpm (64 hz) when the signal is 10 volts DC. This corresponds to a linear conveyor speed range of 0 to 30 feet per minute. As the reference signal sent by the controller 101 to the variable speed conveyor motor drive 102 is increased or decreased, the corresponding speed of the conveyor motor 46 increases or decreases accordingly.

In addition to driving the conveyor motor 38, the variable speed conveyor motor drive 102 sends the electrical signal 124 to the brush motor drive 103. For example, the second reference signal 124 may be the first signal 122 divided by a constant, such as "2." In this example, the second reference signal is in the form of a DC voltage (0-5 volts DC) signal provided to the variable speed brush drive 103. The reference signal 124 provided by the variable speed conveyor motor drive 102 to the variable speed brush drive 103 controls how fast the four brush motors 78 turn. For example, the speed of the brush motors 78 may range from 0 rpm (0 hz) when the signal 124 is 0 volts DC to 928 rpm (32 hz) when the signal 124 is 5 volts DC. This corresponds to a brush speed range of 0 to 644 rpm.

In the illustrated embodiment, the magnitude of the reference signal 124 sent by the variable speed conveyor motor drive 102 to the variable speed brush drive 103 is approximately one half the magnitude of the reference signal 122 received by the variable speed conveyor motor drive 102 from the controller 101. However, it should be noted that the ratio of magnitude of the reference signal 122 provided to the variable speed conveyor motor drive 101 to the reference signal 124 provided to the variable speed brush drive 103 need not be 2:1, but can be any ratio that provides the desired ratio of linear speed of the conveyor to brush speed to accommodate different types of glass plates, low-e coatings, conveyor, motors, brushes, rollers, cleaning liquid and cleaning tolerances being used.

It has been found that for certain brushes if brush speed drops below a threshold, cleaning efficiency suffers. Therefore in an alternate embodiment, if the conveyor speed falls below 10 feet per minute, the brush speed is maintained at 300 rpm. Above that conveyor speed, a linear relation between brush and conveyor speed is maintained until a maximum of 30 feet per minute and 644 rpm is achieved.

In the embodiment depicted in FIG. 1, the variable speed conveyor motor drive 102 is a variable frequency AC drive. However, it is understood that the variable speed conveyor motor drive 102 may be any drive capable of accepting a reference signal from the controller 101 and sending a signal to the conveyor motor 46, which causes the conveyor motor to turn at a speed that varies with the reference signal. In the embodiment of FIG. 1, the variable speed brush drive 103 is a variable frequency AC drive. However, it is understood that the variable speed brush drive 103 may be any drive capable of accepting a reference signal from the controller 101 and sending a signal to the brush motor 78 which causes the brush motor to turn at a speed that varies with the reference signal.

In the glass washing machine embodied in FIG. 1, there is a constant ratio of the linear speed of the glass plate 12 moving along the conveyor 38 and being contacted by the rotating brushes 74a, 74b and the rotational speed of the rotating brushes. Accordingly, in the illustrated embodiment, the glass plates 12 will receive approximately the same number of brush strokes per pass through the washing machine 10, regardless of the linear speed of the conveyor 38.

It should be readily apparent that the ratio of reference signal 122 to 124 need not be constant, i.e. signal 124=constant(signal 124) is not a requirement. The ratio could be set by any given function or a look up table stored in a memory of the controller. For example, the value of the signal 124 could be set as a function of the signal 122.

Example 1: $\text{Signal } 124 = \frac{\text{Signal } 122}{\text{Signal } 122 + \text{Constant}}$ Example 2: $\text{Signal } 124 = \frac{10}{(\text{Signal } 122)^2}$ Example 3: Signal 124 = constant, signal 122 < threshold Signal 124 = signal 124 (second constant), signal 122 >= threshold Any appropriate function could be used.

The following tables illustrates a look up table that could be used to set the value of signal 124 based on signal 122.

| Signal 122 | Signal 124 |
|---|---|
| 0 | 0 |
| 1 | 1 |
| 2 | 2 |
| 3 | 2.5 |
| 4 | 3 |
| 5 | 3.5 |
| 6 | 4.0 |
| 7 | 4.2 |
| 8 | 4.6 |
| 9 | 4.8 |
| 10 | 5 |

Or look up a table that implements a threshold for varying brush speed.

| Signal 122 | Signal 124 |
|---|---|
| 0 | 2.0 |
| 1 | 2.0 |
| 2 | 2.0 |
| 3 | 2.5 |
| 4 | 3 |
| 5 | 3.5 |
| 6 | 4.0 |
| 7 | 4.2 |
| 8 | 4.6 |
| 9 | 4.8 |
| 10 | 5 |

Any appropriate relation of values could be used.

It should be readily apparent that the brushes and conveyor could be electrically coupled to the controller in ways other than as illustrated by FIG. 1. For example, the controller 101 could be directly linked to both the conveyor motor 46 and the brush motor 78. In this embodiment, the reference signals sent to the conveyor motor and the brush motor are calculated by the controller for a given user input value. The user input value may be the conveyor speed or brush speed as described above. It should also be readily apparent that the user input could be a glass type and the conveyor and brush speeds are automatically set by the controller for the selected glass type.

Figure 7:
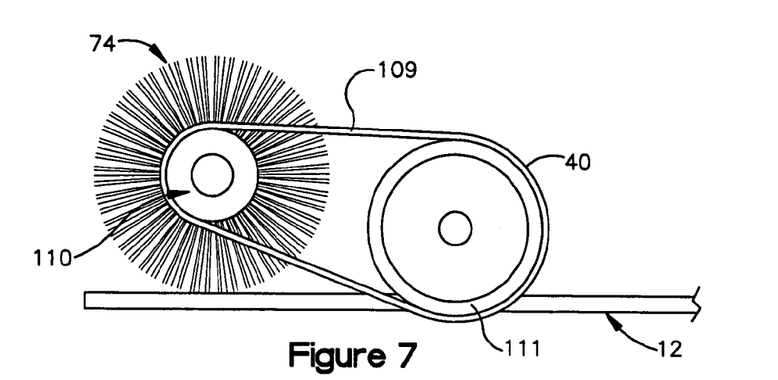
FIG. 7 is a schematic illustration of a brush mechanically coupled to a conveyor in a glass washing machine.

In an alternate embodiment illustrated by FIG. 7, the rotating brushes 74a 74b are mechanically coupled to the conveyor 38 so that the rotational speed of the brushes is dependant upon the linear speed of the conveyor 38. In FIG. 7, the rotating brush 74 is mechanically coupled to the conveyor 38 by means of be it a belt 109 running between a pulley 110 attached to the rotating brush 74 and a pulley 111 attached to a conveyor roller 40, 42. In this embodiment, the brush motors 78 would not be needed. It should be readily apparent that the conveyor and the brushes could be mechanically coupled in any suitable way. For example, the rotating brushes 74 and 74b could be mechanically coupled to the conveyor 38 by one or more gears and/or chains.

The disclosed glass washing machine has many advantages over prior art glass washing machines in which the linear speed of the conveyor 38 was not related to the rotational speed of the rotating brushes 74a, 74b. The present invention reduces the amount of brush wear, reduces scratching of the glass plates, provides more consistent cleaning quality and retains more cleaning fluid in the brushes during idle modes.

All of these advantages are also obtained if, in an alternate embodiment, the roles of the conveyor motor 38 and brush motor are reversed. That is, the speed of the brushes is selected by the user and the speed of the 78 conveyor is dependent on the selected speed of the brushes.

Although the present invention has been described with a degree of particularity, it is the intent that the invention includes all modifications and alterations falling within the spirit and scope of the appended claims.

The invention claimed is:

1. A glass washing machine, comprising:
   a) a conveyor for moving a glass sheet along a path of travel at a controlled linear speed;
   b) a brush rotatable at a controlled rotational speed positioned along said path of travel such that said brush contacts the glass sheet as it moves along said path of travel, wherein said linear speed and said rotational speed are variable and one of said linear speed and said rotational speed is dependent on the other of said linear speed and said rotational speed; and
   c) a controller coupled to said conveyor and brush for controlling said rotational and linear speed, said controller having a threshold such that one of said linear speed and said rotational speed is dependent on the other of said linear speed and said rotational speed when said glass washing machine is operating above said threshold and said linear speed and rotational speed are independent of each other when said glass washing machine is operating below said threshold.

2. The glass washing machine of claim 1 wherein said linear speed and said rotational speed are controlled to maintain a constant ratio of the linear speed to the rotational speed.

3. The glass washing machine of claim 1 wherein said linear speed is controlled with a user input device and said rotational speed is dependent on said linear speed.

4. The glass washing machine of claim 1 wherein said linear speed is variable over a range of speeds and said rotational speed is variable over a range of rotational speeds.

5. The washing machine of claim 4 wherein the rotational speed is fixed for linear speed of the conveyer less than said threshold and varies over a range of rotation speeds for conveyer speeds equal to or greater than said threshold.

6. The glass washing machine of claim 4 wherein said linear speed and said rotational speed are controlled to maintain a constant ratio of the linear speed to the rotational speed.

7. The glass sheet washing machine of claim 1, wherein said linear speed is controlled by controlling voltage applied to a conveyor drive motor and said rotational speed is controlled by controlling a voltage applied to a brush drive motor.

8. The glass sheet washing machine of claim 7, wherein said voltage applied to said brush drive motor is dependent on the voltage applied to the conveyor drive motor.

9. A glass washing machine, comprising:
   a) a conveyor for moving a glass sheet along a path of travel at a controlled linear speed;
   b) a conveyor drive motor for driving said conveyor at said linear speed wherein said linear speed is controlled by controlling voltage applied to said conveyor drive motor;
   c) a brush rotatable at a controlled rotational speed positioned along said path of travel such that said brush contacts the glass sheet as it moves along said path of travel;
   d) a brush motor for driving said brush at said rotational speed wherein said rotational speed is controlled by controlling voltage applied to said brush drive motor;
   e) a user input device for adjusting said linear speed, wherein said rotational speed is dependent on said linear speed; and
   f) a controller coupled to said conveyor drive motor and said brush motor that monitors a prescribed linear speed limit such that when the linear speed is below said linear speed limit the rotational speed is set at a first value by said controller and when the linear speed is set above said linear speed limit, the rotational speed is set at a second value by said controller which is greater than said first value.

10. The glass washing machine of claim 9 wherein the conveyor drive motor and the brush motor are electronically coupled.

11. The glass washing machine of claim 9 wherein said linear speed and said rotational speed are controlled to maintain a constant ratio of the linear speed to the rotational speed.

12. The glass washing machine of claim 9 wherein said linear speed is continuously variable over a range of linear speeds and said rotational speed is continuously variable over a range of rotational speeds.

13. The glass sheet washing machine of claim 9, wherein said voltage applied to said brush drive motor is dependent on the voltage applied to the conveyor drive motor.

14. The glass sheet washing machine of claim 9, wherein the ratio of voltage applied to said conveyor drive motor relative to the voltage applied to said brush drive motor is about 2:1.

15. The glass sheet washing machine of claim 9, wherein said linear speed is from about 1 to 30 feet per minute and said rotational speed is from about 90 to 644 revolutions per minute.

16. The washing machine of claim 9 wherein the rotational speed is fixed for linear speed of the conveyor less than a threshold and varies over a range of rotation speeds for conveyor speeds equal to or greater than said threshold.

17. A glass washing machine comprising:
   a conveyor for moving a glass sheet along a path of travel at a controlled linear speed;
   a brush rotatable at a controlled rotational speed positioned along said path of travel, said linear speed and said rotational speed are variable and one of said linear speed and rotational speed is dependent on the other of said linear speed and said rotational speed when said linear speed is operating above a threshold and said linear speed and rotational speed are independent of each other when said linear speed is operating below said threshold; and
   a controller for controlling said linear and rotational speeds of said glass washing machine comprising said threshold.

18. The glass washing machine of claim 17 wherein said linear speed and said rotational speed are controlled to maintain a constant ratio of the linear speed to the rotational speed.

19. The glass washing machine of claim 17 wherein said linear speed is controlled with a user input device and said rotational speed is dependent on said linear speed.

* * * * *